United States Patent
Castro et al.

(10) Patent No.: US 6,569,232 B2
(45) Date of Patent: *May 27, 2003

(54) FIBER REINFORCED LIGHT WEIGHT CELLULAR CONCRETE

(76) Inventors: Magdiel Castro, 10825 SW. 112 Ave., Apt. 118, Miami, FL (US) 33176; Osvaldo Moran, 12180 SW. 87 Ave., Miami, FL (US) 33176

( * ) Notice: Subject to any disclaimer, the term of this patent is extended or adjusted under 35 U.S.C. 154(b) by 0 days.

This patent is subject to a terminal disclaimer.

(21) Appl. No.: 09/760,312

(22) Filed: Jan. 10, 2001

(65) Prior Publication Data

US 2002/0178971 A1 Dec. 5, 2002

Related U.S. Application Data

(63) Continuation-in-part of application No. 09/371,891, filed on Aug. 9, 1999.

(51) Int. Cl.⁷ ............................................... C04B 16/06
(52) U.S. Cl. .................. 106/644; 106/705; 106/714; 106/724; 106/799; 106/802

(58) Field of Search .................. 106/644, 724, 106/802, 705, 714, 799

(56) References Cited

U.S. PATENT DOCUMENTS

| 5,397,516 | A | | 3/1995 | Sikaffy | ........................ 264/42 |
| 6,203,609 | B1 | * | 3/2001 | Castro et al. | ................ 106/705 |

* cited by examiner

*Primary Examiner*—Paul Marcantoni
(74) *Attorney, Agent, or Firm*—J. Sanchelima; A. Bordas

(57) ABSTRACT

The present fiber reinforced cellular concrete is produced through a chemical reaction that does not require high heat or pressure ovens (autoclaves). Among its unique features, is the fact that different compression strengths can be obtained by varying the proportion of ingredients and resulting densities. The concrete utilizes a base of a pozzolanic product with aluminum powder, lime, calcium formate, cement, and polypropylene fiber is added, along with water. Expanded shale, clay or slate is added to provide lower shrinkage to the resulting mass reducing cracking. Optionally, sand and compatible reinforcing material can also be added.

6 Claims, No Drawings

FIBER REINFORCED LIGHT WEIGHT CELLULAR CONCRETE

This application is a continuation-in-part of U.S. Ser. No. 09/371,891 filed Aug. 9, 1999.

BACKGROUND OF THE INVENTION

1. Field of the Invention

The present invention relates to fiber reinforced cellular concrete, and more particularly, to a fiber reinforced cellular concrete to be used in applications where the density and compression strength characteristics of the construction material can be selectively adjusted. By introducing expanded shale, clay or slate.

2. Other Related Applications

The present application is a continuation-in-part of pending U.S. patent application Ser. No. 09/371,891, filed on Aug. 9, 1999, which is hereby incorporated by reference.

3. Description of the Related Art

It is desirable for construction applications to use cementitious materials that are lightweight while maintaining an acceptable structural strength. The incorporation of fly ash and pozzolanic products in combination with Portland cement offers several advantages. The lime released in the formation of concrete react with elements in fly ash creating additional cementitious material thus increasing compression strength and reducing the permeability of the concrete; this in turn reduces the corrosion to the reinforcing metals. In addition to lowering the cost of concrete, the use of fly ash, slag and other recyclable industrial wastes is compatible with ever increasing ecological concerns.

The present fiber reinforced cellular concrete is, unlike traditional cellular concretes, produced without requiring high heat pressure ovens (autoclaves). Among its unique features, is the fact that different compression strengths can be obtained by varying the proportion of ingredients and resulting densities. The concrete utilizes a base of a pozzolanic product mixed with aluminum powder, lime, calcium formate and fiber along with water. Optionally, reinforcing material can also be added.

Applicant believes that the closest reference corresponds to U.S. Pat. No. 5,397,516 issued to Sikaffy on Mar. 14, 1995 and assigned to Thermo Cement Engineering Corp. However, it differs from the present invention because it does not require raising the temperature, permits the use of fly ash and any pozzolanic product as well as regular sand with the consequent ability to adjust the compression strength of the material to predetermined levels and does not require the use of ferric chloride or magnesium fluorsilicate. Additionally, the present invention does not require a high speed mixer, as in the patented invention.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a cementitious construction material that can be produced at any temperature with very high compressive strength and extremely low shrinkage factor.

It is another object of this invention to provide a material that uses fly ash, pozzolanic product, and sand in different proportions, and in extreme situations, uses exclusively fly ash or bottom furnice slag or combination of both instead of Portland cement.

It is still another object of the present invention to provide a material that does not require the use of ferric chloride or other corrosive materials.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

DETAILED DESCRIPTION OF THE PREFERRED EMBODIMENT

The present invention is a cementitious material that depending on the proportions, will have different densities and compression strength coefficients.

The ingredients are water, a pozzolanic material, lime, aluminum powder, calcium formate, polypropylene fiber, cement, sand, and compatible reinforcement material (optimal). The following table provides the ranges for the best results obtained in one column and one specific formulation used a construction application involving construction of wall members, normalized for 100 Kg. of cellular concrete.

| Ingredient | Range | Specific Formula |
| --- | --- | --- |
| 1. Pozzolanic product | 1–69.75 Kg. | 10.802 Kg. |
| 2. Water | 30–70 Kg. | 8.13 Kg. |
| 3. Aluminum powder | 0.05–0.12 Kg. | 0.028 Kg. |
| 4. Lime | 0.15–7.5 Kg. | 0.691 Kg. |
| 5. Calcium formate | 0.05–0.12 Kg. | 0.028 Kg. |
| 6. Polypropylene fiber | 0–0.8 Kg. | 0.169 Kg. |
| 7. Cement | 0–68.75 Kg. | 10.152 Kg. |
| 8. Sand | 0–30 Kg. | optional |
| 9. Reinforcement material | 0–as required | optional |
| 10. Expanded shale, clay or slide | 1–85 Kg. | 70 Kg. |

The pozzolanic products could be fly ash, bottom slag or coal ash.

The fiber used can be any fibers (natural or synthetic) such polypropylene fibers. The reinforcement material can be: metals, such as iron rebars, steel forms, galvanized metals V's, and aluminium forms; and plastics such as carbon based, silicone based, and polypropylene.

Expanded shale, clay or slate is added to provide lower shrinkage to the resulting mass. This has been found to reduce the cracking problem of cellular concrete.

What is claimed is:

1. A compound to be used in construction applications, consisting essentially of:
    A) between 1 and 69.75 Kg. of a pozzolana;
    B) water between 30 and 70 Kg.;
    C) aluminum powder between 0.05 and 0.12 Kg.;
    D) lime between 0.15 and 7.5 Kg.;
    E) calcium formate between 0.05 and 0.12 Kg; and
    F) expanded shale between 1 and 85 Kg. so that the total resulting compound weighs 100 Kg.
2. The compound set forth in claim 1 further comprising:
    G) up to 0.8 Kg. of polypropylene fiber.
3. The compound set forth in claim 2 further comprising:
    H) up to 68.75 Kg. of cement.
4. The compound set forth in claim 3 further comprising:
    I) up to 30 Kg. of sand.
5. The compound set forth in claim 4 further comprising:
    J) a reinforcement material.
6. The compound set forth in claim 5 where said reinforcement material includes at least one element selected from the group consisting of iron, steel, galvanized metal, aluminum, carbon containing plastics, silicon containing plastics, and polipropylene.

* * * * *